United States Patent [19]

Faller

[11] Patent Number: 4,817,435
[45] Date of Patent: Apr. 4, 1989

[54] SHEAR PRESSURE GAGE
[75] Inventor: James G. Faller, Newark, Del.
[73] Assignee: The United States of America as represented by the Secretary of the Army, Washington, D.C.
[21] Appl. No.: 166,069
[22] Filed: Mar. 9, 1988
[51] Int. Cl.$^4$ ............................................. G01L 7/00
[52] U.S. Cl. ...................................... 73/700; 73/167; 73/838
[58] Field of Search ................ 73/838, 700, 709, 167; 116/266, 270; 137/68.1, 68.2

[56] References Cited

U.S. PATENT DOCUMENTS 3,780,752 12/1973 Naddin et al. .................. 137/68.1
4,195,745 4/1980 Roberts et al. .............. 137/68.1 X
4,590,957 5/1986 McFarlane ..................... 137/68.1

Primary Examiner—Jerry W. Myracle
Attorney, Agent, or Firm—Saul Elbaum; Thomas E. McDonald; Alan J. Kennedy

[57] ABSTRACT

A shear gage for measuring the pressure reached in a firearm cartridge located within the barrel when a high caliber gun is fired. The design of the shear gage involves the shearing of a uniformly distributed loaded circular plate at its circumferential support in the event that a predetermined maximum critical shear pressure is exceeded. Stresses due to bending and shear were analyzed to select the proper hole diameter to thickness ratio to ensure that the disc or plate fails due to a shearing failure and not a bending failure. A series of varying sized circumferential supports may also be positioned within the chamber to provide a range of critical failure pressures to more precisely estimate the actual pressure that occurs within the chamber or cartridge.

13 Claims, 4 Drawing Sheets

SHEAR PRESSURE GAGE

GOVERNMENTAL INTERESTS

The invention described herein may be manufactured, used and licensed by or for the government, for governmental purposes without the payment to me of any royalties thereon.

BACKGROUND OF THE INVENTION

1. Field of the Invention

The present invention relates to a simple, low cost and highly reliable apparatus for indicating peak pressures encountered in high pressure applications, such as within the cartridges exploded in gun barrels during the firing of high caliber guns.

2. Description of the Prior Art

In the recent past a number of failure incidents involving large caliber guns have taken place during ballistics testing by the U.S. Army. In these cases, no accurate data of the pressures reached in the gun before tube failure were obtained, this occurred in spite of the presence of both mechanical pressure gases and piezoelectric transducers on the gun. It was apparent in these failures that the gages used had neither the range to measure the high chamber pressure nor the capacity to survive the shock and impact damages associated with a catastrophic event. The upper range of the crusher gage was 110,000 psi and the upper range of the piezoelectric gage was 108,000 psi. The crusher gage relies on fine dimensional measurements on a copper sphere for its pressure reading. This gage comprises a housing with a cylinder therein and a piston in the cylinder. A sphere of copper is placed between the flat end of the piston and the flat end of the cylinder. Pressure against the piston crushes this sphere of copper in proportion to the force exerted against the piston.

The crusher gage may be inaccurate and inconsistent in successive readings for several reasons. The crusher gage relies on a moving piston to apply pressure to the sphere. If the free movement of the piston is hindered, the gage will not accurately record pressures. Free movement of the piston becomes difficult to achieve at temperature extremes (below −40° C. and above 60° C.) and at pressure extremes (over 110,000 psi), since body parts expand nonuniformly under temperature and deform excessively under pressure eliminating built-in tolerances.

The piezoelectric gage, on the other hand, is even more easily incapacitated by the destruction of wires and terminal connections. In addition, its piezo crystal may respond unpredictably if the hole into which it is fitted becomes deformed.

A third kind of high pressure indicator or gage is described in U.S. Pat. No. 3,345,876 wherein a circular disc is placed within a high pressure gage. The disk is subjected to a high pressure which causes the disc to deform. The disc is then examined to determine the degree of pressure reached by the amount of deformity of the disc. However, the pressure gage described in the above mentioned patent is only reliable for peak pressures of 10,000 to 100,000 psi.

A new gage has been designed to address the need for measurement of chamber pressure above the range of the pressure gage and other gages mentioned above, although pressures above 120,000 psi are presently outside the range of normal functioning guns.

SUMMARY OF THE INVENTION

A gage is provided for indicating if a predetermined pressure is exceeded within a high pressure chamber, such as for example within the shell cartridge of a high caliber gun when the gun is fired. Within this gage a wafer or disc of a predetermined thickness and known material is placed upon a housing having a cylindrical cavity of a known diameter such that the disc covers the cavity. The seal between the disc and the housing is air tight. The side of the disc opposite the cavity is exposed or open to the interior of the high pressure chamber. When an explosion occurs within the chamber that exceeds a maximum predetermined critical pressure, it will cause the disc to rupture or shear at the circumference of the cylindrical cavity indicating that the predetermined critical shear pressure was exceeded. It is also possible to place or machine a series of cylindrical cavities of varying sized diameters within the housing under the disc to more precisely estimate the actual pressure achieved within the high pressure chamber. Thus, when an explosion occurs within the chamber, the disc or discs should rupture above all cavities for which the actual chamber pressure exceeds the critical pressure for that sized diameter cavity and disc thickness.

It is there a primary object of this invention to provide a new gage for measuring the pressure reached in high pressure chambers such as the cartridge chamber in large caliber guns.

It is another object of this invention to provide a pressure measurement gage that has the ability to survive the shock and impact damage associated with the catastrophic burst of high pressure.

It is a further object of this invention to provide a pressure measurement gage that contains no moving parts.

It is a further object of this invention to provide a pressure measurement gage which is economical to manufacture and relatively easy to operate.

DETAILED DESCRIPTION OF THE PREFERRED EMBODIMENT

Figure 1:
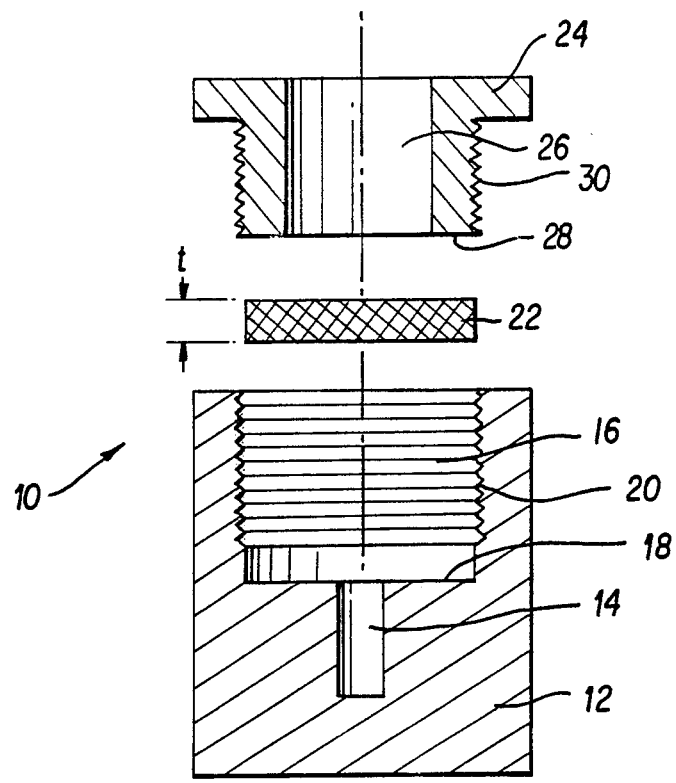
FIG. 1 is a cross sectional exploded view of the components of the shear pressure gage.
Figure 2:
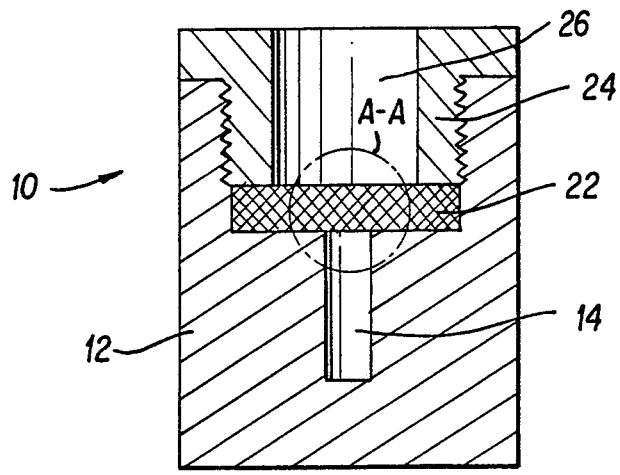
FIG. 2 is a cross sectional view of the assembled components of the shear pressure gage.

Referring now specifically to the drawings, in FIG. 1 there is shown a shear test gage generally at 10. The shear test gage 10 is comprised of a housing 12 containing a narrow cylindrical cavity 14 and a bored cavity 16 that is larger than the narrow cylindrical cavity 14 and also positioned above narrow cylindrical cavity 14. The bottom surface 18 of bored cylindrical cavity 16 is machined so that it is very flat to assure a good pressure seal when mated with other test gage components. Without a good pressure seal the gage as designed cannot be expected to function accurately. A circular disc 22 is designed to be placed into bored cavity 16. Circular disc 22 is held secured in place in housing 12 by retention ring 24 as is illustrated in FIG. 2. Retention ring 24 may be secured or attached to bored cavity 16 by any well known manner such as by machining screw threads 20 onto bored cavity 16 and machining screw threads 30 onto the outer wall of retention ring 24. Rim surface 28 secures disc 22 in place. Pressure during testing is applied to disc 22 via internal passage 26 in the hollow center retention ring 24.

Figure 5:
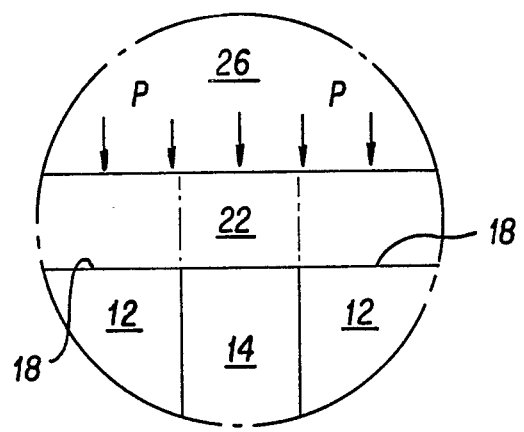
FIG. 5 is an enlarged view of FIG. 2 showing the area indicated within circle A—A.

The operation of pressure gage 10 involves the shearing of a uniformly distributed loaded circular plate at its circumferential support. Looking at FIG. 5 the circumferential support in this case would be that area of flat surface 18 immediately around narrow cylindrical cavity 14. The circular plate would be that area of disc 22 that is immediately above narrow cylindrical cavity 14. To ensure that shearing and not a bending failure occurred, since a bending failure would not be interpretable, it was necessary to choose the proper hole radius (r) for cylindrical cavity 14 to plate thickness (t) as is shown in FIG. 5. This was done by solving simultaneously the equations for bending and shear failure. Bending failure will occur at the pressure predicted by the following equations:

$$P_b = 4S(t/r)^2/3$$

$P_b$ = pressure to initiate tensile yield at the support
$S$ = tensile yield strength of the material
$t$ = thickness of the plate
$r$ = radius of the hole under the plate The pressure which will cause shearing is given by the following equation:

$$P_s = 2T(t/r)$$

$P_s$ = pressure to cause shear failure at the support
$T$ = ultimate shear strength of the material
$t$ = thickness of the plate
$r$ = radius of the hole under the plate The above equations can be developed simultaneously by setting $P_b$ equal to $P_s$, resulting in the deviation of the critical hole radius to thickness ratio, $(r/t)_{cr}$, for a shear failure. This relationship is given by $$(r/t)_{cr} = \frac{2S}{3T}$$

and the corresponding critical pressure, $P_{cr}$, by $$P_{cr} = \frac{3T^2}{S}$$

Figure 3:
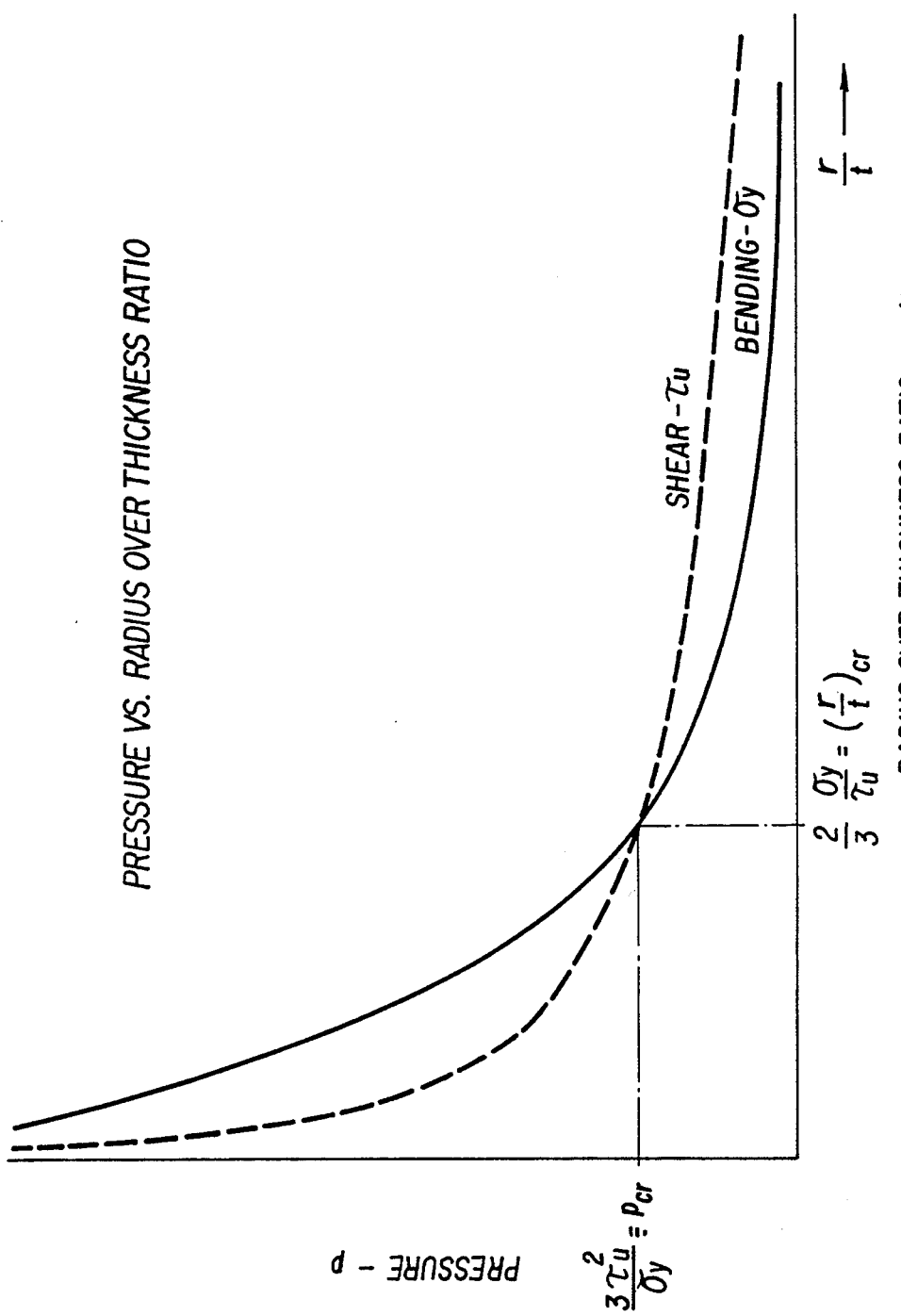
FIG. 3 is a chart showing the relationship between the chamber pressure and the radius over thickness ratio (r/t).

The relationship of the pressure on the disc versus the radius over thickness ratio is shown in FIG. 3. It can be seen that the critical pressure is the pressure which will cause the simultaneous failure in shear and the initiation of tensile yield at the support. Below the critical pressure value, the plate will not fail so long as the critical (r/t) ratio is not exceeded. For pressures greater than the critical pressure, the plate will fail in shear if the (r/t) ratio is kept less than the critical (r/t) ratio.

The mechanical properties of a large number of aluminum and steel materials were examined to find the pressure range over which they could be used. A partial list of the materials is shown below in Table 1. The properties indicate that the shear gage has a range from 20,000 psi to 350,000 psi. The critical radius to plate thickness ratios for the materials listed below are between 0.36 and 1.15.

TABLE 1

Pertinent Shear Gage Data
($S_y$, $T_u$, r/t, P)
For Some Steel and Aluminum Metals

| Metal | Tensile Yield Stress $S_y$(ksi) | Ultimate Shear Stress - $T_u$(ksi) | Chamber Pressure $P_{cr}$(ksi) | Radius to Thickness Ratio - $(r/t)_{cr}$(in/in) |
|---|---|---|---|---|
| Steel 1020 Norm | 50 | 54.2 | 176.26 | 0.615 |
| Steel 1030 Annealed | 50 | 51.4 | 158.52 | 0.649 |
| Steel 1095 Annealed | 55 | 63 | 216.49 | 0.582 |
| Steel 4140 OQ + 1200F | 95 | 55 | 95.53 | 1.152 |
| Steel 4140 OQ + 1000F | 143 | 100 | 209.79 | 0.953 |
| Steel 8630 Norm | 62 | 85 | 349.60 | 0.486 |
| *Aluminum 1060-H16 | 15 | 10 | 20.00 | 1.000 |
| *Aluminum 1060-H18 | 18 | 11 | 20.17 | 1.091 |
| *Aluminum 2011-T3 | 43 | 32 | 71.44 | 0.896 |
| *Aluminum 2014-0 | 14 | 18 | 69.43 | 0.519 |
| *Aluminum 3004-H32 | 25 | 17 | 34.68 | 0.980 |
| *Aluminum 5005-0 | 6 | 11 | 60.50 | 0.364 |
| *Aluminum 5005-H12 | 19 | 14 | 30.95 | 0.905 |
| *Aluminum 5052-H38 | 37 | 24 | 46.70 | 1.028 |
| *Aluminum 6262-T9 | 55 | 35 | 66.82 | 1.048 |
| *Aluminum 6463-T6 | 31 | 22 | 46.84 | 0.939 |

As an example as to how the gage would operate, assume the following conditions utilizing the information shown in Table 1. If Aluminum 1060-H16 is selected as the test material for a 0.1 inch thick disc 22 as shown in FIG. 2, then the critical (r/t) ratio is equal to 1.000 according to Table 1. The radius (r) for narrow cylindrical cavity 14 should be 0.1 inch. With these conditions, disc 22 should rupture or fail in shear only if the chamber 26 test pressure in internal passage 26 exceeds 20,000 psi.

Figure 4:
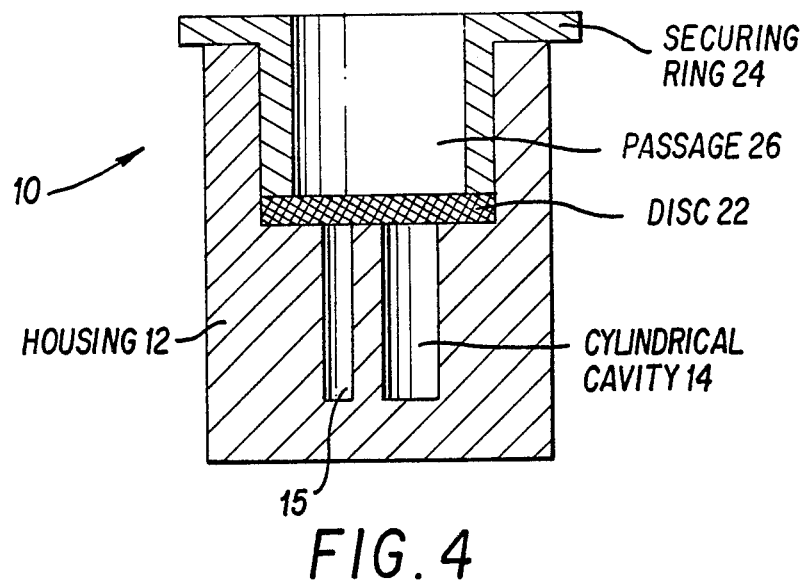
FIG. 4 is a cross sectional view showing an alternate embodiment of the components of the shear pressure gage.

Another embodiment of the invention is shown in FIG. 4. In FIG. 4 the test gage 10 is shown with two cylindrical cavities, 14 and 15, in housing 12. If the cylindrical cavity 14 has a diameter of 0.2 inches as was illustrated in the above mentioned example and cylindrical cavity 15 has a diameter of one-half that amount or 0.1 inch, then the section of the disc above cavity 15 should fail if the critical pressure exceeds 40,000 psi. Therefore, if the critical pressure does not exceed 20,000 psi, neither disc will rupture. If the pressure is 30,000 psi, the section of the disc above cavity 14 should rupture, however, the section of the disc above cavity 15 should not rupture. And if the pressure exceeds 40,000 psi, the disc portions or sections above cavities 14 and 15 should both rupture.

It can be seen that by selecting the proper thickness and material for disc 22 and the proper radius for the cylindrical cavity 14 or 15, should two cavities be desired to have a range for testing, a test device could be constructed that would check a particular critical pressure for pressures up to 350,000 psi if Steel 8630 is selected as the test material for disc 22.

Figure 6:
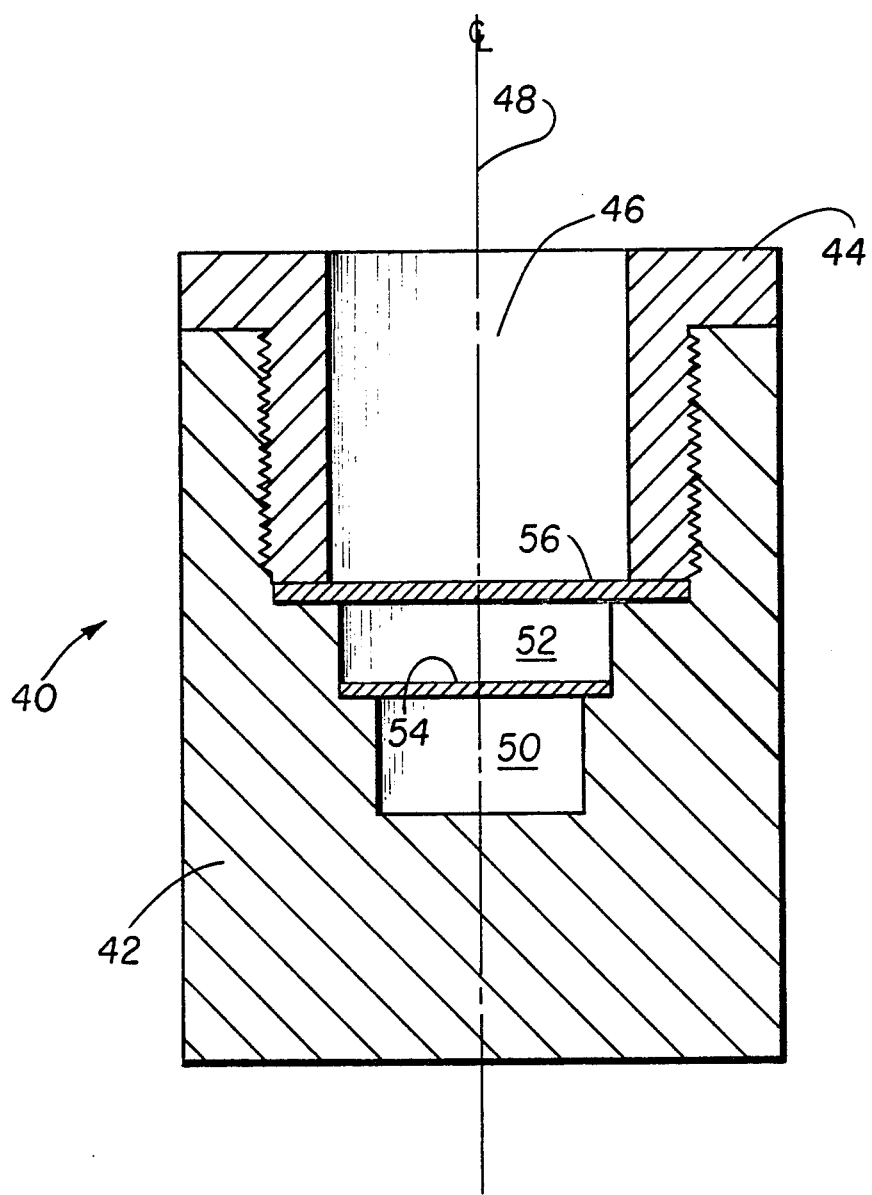
FIG. 6 is a cross sectional view showing a third embodiment of the components of the shear pressure gage.

A third embodiment of the invention is shown in FIG. 6, wherein the two cylindrical cavities 14 and 15 shown side by side in FIG. 4 are now positioned such that cylindrical cavities 50 and 52 are stacked vertically concentrically about a common center line 48. In this embodiment cylindrical cavity 50 will have disc 54 positioned above and covering cylindrical cavity 50; and cylindrical cavity 52 will have disc 56 positioned above and covering cylindrical cavity 52. If cylindrical cavity 52 has a diameter of 0.2 inches and cylindrical cavity 50 has a diameter of one-half of that amount or 0.1 inch, using the initial example of Aluminum 1060-H16 described above, then disc 56 above cavity 52 should rupture or fail if the critical pressure exceeds 20,000 psi; and disc 54 above cavity 50 should also rupture or fail subsequent to the failure of disc 56, if the critical pressure exceeds 40,000 psi. Therefore, if the critical pressure does not exceed 20,000 psi, neither disc 56 nor disc 54 will rupture. If the critical pressure is 30,000 psi, disc 56 should rupture; however, disc 54 should not rupture; and if the pressure exceeds 40,000 psi, both disc 54 and disc 56 should rupture.

It should be noted that more than two cylindrical cavities may be incorporated into the test devices described in FIG. 4 or FIG. 6. Also each disc shown in FIG. 6 may be held in place utilizing a retention ring (not shown).

While I have described and shown the particular embodiments of my invention, it will be understood that many modifications may be made without departing from the spirit thereof, and I contemplate by the appended claims to cover any such modifications as fall within the true spirit and scope of my invention.

I claim:

1. A pressure indicating apparatus comprising:
    a body member having a bored cavity, and a plurality of smaller cylindrical cavities of varying diameters located beneath said bored cavity,
    a disc member positioned at the bottom of said bored cavity and covering said smaller cylindrical cavities;
    means for securing said disc member adjacent to said housing and for admitting pressure through said bored cavity to said disc;
    wherein said disc member will rupture in the region immediately about the diameter of any said smaller cylindrical cavity if a predetermined critical pressure for any said cylindrical cavity is exceeded.

2. The pressure indicating device of claim 1 wherein said plurality of smaller cylindrical cavities comprises two cavities.

3. The pressure indicating device of claim 1 wherein said means for securing said discs comprises a retention ring that is rigidly affixed to said body member and said disc in position adjacent said housing.

4. The pressure indicating device of claim 3 wherein said retention ring engages the walls of said bored cavity.

5. The pressure indicating device of claim 4 wherein when said disc is affixed in position adjacent said body member an air tight seal is formed.

6. The pressure indicating device of claim 1 wherein the thickness of said disc and the radius of said smaller cylindrical cavities is chosen such that the ratio of the thickness over the radius for a given material will ensure that if said critical pressure is exceeded, said disc will fail due shear stress.

7. A pressure indicating apparatus comprising:
    a body member having a bored cavity, and a plurality of smaller cylindrical cavities of varying, progressively smaller diameters located beneath said bored cavity, wherein each said cavity is aligned about a common center line;
    disc members positioned above and covering each of said smaller cylindrical cavities;
    means for securing the upper large diameter disc member adjacent to said housing and for admitting pressure through said bored cavity to said largest diameter disc member;
    wherein said disc members will rupture in the region immediately about the diameter of any said smaller cylindrical cavity if a predetermined critical pressure for any said cylindrical cavity is exceeded.

8. The pressure indicating device of claim 7 wherein said plurality of smaller cylindrical cavities comprises two cavities.

9. The pressure indicating device of claim 7 wherein said means for securing said largest diameter comprises a retention ring that is rigidly affixed to said body member and said disc wherein said retention ring is fixed in position adjacent said housing.

10. The pressure indicating device of claim 9 wherein said retention ring engages the walls of said bored cavity.

11. The pressure indicating device of claim 10 wherein when said largest diameter affixed in position adjacent said body member an air tight seal is formed.

12. The pressure indicating device of claim 7 wherein the thickness of each said disc and the radius of said respective smaller cylindrical cavity is chosen such that the ratio of the thickness over the radius for a given material will ensure that if said critical pressure is exceeded, said disc will fail due shear stress.

13. The pressure indicating device of claim 7 wherein all said discs are secured in place.

* * * * *